US012345484B2

(12) United States Patent
McGinnis et al.

(10) Patent No.: US 12,345,484 B2
(45) **Date of Patent: *Jul. 1, 2025**

(54) CLEANING SYSTEM AND METHOD

(71) Applicant: Dos Viejos Amigos, LLC, Greenup, KY (US)

(72) Inventors: Bradley A. McGinnis, Greenup, KY (US); Rodrick E. Hall, Huffman, TX (US); Jeff Bause, Flanders, NJ (US)

(73) Assignee: DOS VIEJOS AMIGOS, LLC, Greenup, KY (US)

( * ) Notice: Subject to any disclaimer, the term of this patent is extended or adjusted under 35 U.S.C. 154(b) by 169 days.

This patent is subject to a terminal disclaimer.

(21) Appl. No.: 18/209,214

(22) Filed: Jun. 13, 2023

(65) Prior Publication Data

US 2024/0077262 A1 Mar. 7, 2024

Related U.S. Application Data

(63) Continuation of application No. 17/837,373, filed on Jun. 10, 2022, now Pat. No. 11,841,198, which is a (Continued)

(51) Int. Cl.

*F22B 37/54* (2006.01)
*B08B 9/032* (2006.01)

(Continued)

(52) U.S. Cl.

CPC ............ *F28G 3/163* (2013.01); *B08B 9/0323* (2013.01); *F22B 37/48* (2013.01); *F28D 2021/0024* (2013.01)

(58) Field of Classification Search

CPC ........... B08B 7/0007; B08B 5/02; B08B 3/02; B08B 5/00; F22B 37/48; F22B 37/486; F22B 37/56

See application file for complete search history.

(56) References Cited

U.S. PATENT DOCUMENTS

| | | | |
|---|---|---|---|
| 3,552,259 | A | 1/1971 | Griffith |
| 4,462,319 | A | 7/1984 | Larsen |

(Continued)

FOREIGN PATENT DOCUMENTS

| | | | | |
|---|---|---|---|---|
| CH | 695117 A5 | 12/2005 | | |
| WO | WO-2013082730 A1 * | 6/2013 | .......... | B08B 7/0007 |

OTHER PUBLICATIONS

"PressureWave Plus* for coal-fired power plants and HRSG cleaning", GE Power Fact Sheet, https://www.ge.com/content/dam/gepower-pgdp/global/en_US/documents/service/hrsg%20services/ge-pressurewave-plus-boiler-hrsg-cleaning.pdf, pp. 1 & 2, 2017, General Electric Company.

(Continued)

*Primary Examiner* — Gregory A Wilson
(74) *Attorney, Agent, or Firm* — Myers Wolin, LLC

(57) ABSTRACT

A cleaning system includes an explosive subsystem including: a plurality of detonation cords extending along a direction different from a vertical direction; and a locating assembly locating the plurality of detonation cords relative to each other. The locating assembly spaces each of the detonation cords apart from a system to be cleaned. The cleaning system includes a pressurized air blower assembly adjacent a portion of the system to be cleaned, the pressurized air blower assembly being configured to direct pressurized air towards the portion of the system to be cleaned after the detonation cords have been exploded.

17 Claims, 8 Drawing Sheets

Related U.S. Application Data continuation-in-part of application No. 17/703,652, filed on Mar. 24, 2022, now Pat. No. 11,644,255, which is a continuation of application No. 17/204,423, filed on Mar. 17, 2021, now Pat. No. 11,421,951, which is a continuation of application No. 16/249,120, filed on Jan. 16, 2019, now Pat. No. 10,962,311.

(51) Int. Cl.

| | |
|---|---|
| ***F22B 37/48*** | (2006.01) |
| ***F28G 3/16*** | (2006.01) |
| *F28D 21/00* | (2006.01) |

(56) References Cited

U.S. PATENT DOCUMENTS

| | | | | |
|---|---|---|---|---|
| 5,056,587 | A * | 10/1991 | Jones | F28G 7/005 134/1 |
| 5,196,648 | A | 3/1993 | Jones | |
| 5,211,135 | A * | 5/1993 | Correia | F28G 7/00 165/95 |
| 5,307,743 | A | 5/1994 | Jones | |
| 5,769,034 | A | 6/1998 | Zilka et al. | |
| 6,422,068 | B1 | 7/2002 | Schroder et al. | |
| 6,935,281 | B2 * | 8/2005 | Ruegg | B08B 7/0007 165/84 |
| 8,002,902 | B2 | 8/2011 | Krowech | |
| 9,636,717 | B2 * | 5/2017 | Flury | F27D 25/006 |
| 2008/0264357 | A1 * | 10/2008 | Liljegren | B08B 7/0007 122/379 |
| 2009/0229068 | A1 * | 9/2009 | Henderson | B08B 7/02 15/316.1 |
| 2009/0277479 | A1 | 11/2009 | Lupkes | |
| 2010/0037793 | A1 * | 2/2010 | Lee | F42D 1/00 264/3.1 |
| 2011/0226284 | A1 | 9/2011 | Taylor et al. | |
| 2019/0178593 | A1 | 6/2019 | Boye et al. | |

OTHER PUBLICATIONS

Lupkes, K. et al., “Harness detonation waves to clean boiler tubes”, https://www.powermag.com/harness-detonation-waves-to-clean-boiler-tubes/, Oct. 15, 2007, pp. 1-13.

“45th Annual Conference on Explosives and Blasting Technique—Technical Papers”, https://www.isee.org/conferences/2019-conference/technical-papers, Aug. 14, 2018, pp. 1-5.

Vorfeld, J., “Experiences with On-Line Explosive De-Slagging at Covanta WTE Facilities”, 2007, pp. 1-11.

Dr. Sc. Techn. Dipl. Ing. Steiner, C., “Continuous Boiler Cleaning with Explosion Generators—the Alternative to Soot Blowers, Shower Cleaning and Water Canons”, Jul. 2012, pp. 1-15.

“SMART Explosion Efficient Boiler Cleaning with Explosion Generators”, https://www.cbpg.com/sites/default/files/2017-10/171018_EN_SMART%20Explosion.pdf, Cyde Bergemann GmbH, Oct. 2017, pp. 1-6.

Martino, Justin, “Boiler Cleaning Methods & Techniques”, Apr. 14, 2014. pp. 1-5.

Peltier, Dr. Robert, “Using Explosives for Boiler Deslagging”, Mar. 28, 2012. pp. 1-11.

“Clemtex Heavy Duty Spinblast Tool SB-636-B”, Operation Manual. Website: http://clemtex.com/literature/files/SB-636-B_Literature.pdf, 1 page.

Non-final Office Action issued by the U.S. Appl. No. 17/204,423, dated Feb. 28, 2022.

* cited by examiner

CLEANING SYSTEM AND METHOD

CROSS-REFERENCE TO RELATED APPLICATIONS

This application is a Continuation of U.S. patent application Ser. No. 17/837,373, filed Jun. 10, 2022, which is a Continuation in Part of U.S. patent application Ser. No. 17/703,652, filed Mar. 24, 2022, which is a Continuation of U.S. application Ser. No. 17/204,423, filed on Mar. 17, 2021, which is a Continuation of U.S. application Ser. No. 16/249,120, filed on Jan. 16, 2019, now U.S. Pat. No. 10,962,311 granted on Mar. 30, 2021. The contents of each are herein incorporated by reference.

FIELD

The present disclosure relates to a cleaning system and method. More specifically, the present disclosure relates to cleaning systems and methods using explosives and pressurized air.

BACKGROUND

This section provides background information related to the present disclosure which is not necessarily prior art.

The HRSG finned-tubing become fouled over time, during use. The fouling can significantly reduce the efficiency and power output of an HRSG because the fouling reduces the amount and rate of heat exchange with the exhaust gas flowing across the finned-tubing. The fouling is caused by multiple factors, including certain salt deposits, sulfur compounds, and corrosion due to humidity and other factors.

It is known to use explosives, including detonation cord (detcord), in various configurations, to clean smooth-sided, non-finned tubes in coal-fired boilers. For example, U.S. Pat. No. 5,056,587, entitled Method for Deslagging a Boiler, teaches various arrangements of detcord attached directly to boiler tubes, including exploding a series of detcord lengths in sequence. U.S. Pat. No. 5,211,135, entitled Apparatus and Method of Deslagging a Boiler with an Explosive Blastwave and Kinetic Energy, teaches spacing a plurality of detcord clusters formed into three-dimensional geometries between tubing panels in a sequence.

It is also known to use sudden gas combustion to create a pressure wave to vibrate tubes, including HRSG finned-tubing, and dislodge fouling from the tubing. One such system is the PressureWave Plus™ developed by BANG & CLEAN® GmbH and marketed by General Electric Company. As stated in a 2017 General Electric brochure for PressureWave Plus™, "[p]ressure waves generated by the combustion of gas typically propagate at much lower speeds than pressure waves generated by explosives". Thus, prior to the present disclosure, those skilled in the art used gas combustion or other means and avoided using explosives to clean the HRSG finned-tubing due to the mistaken belief that explosives would damage the relatively thin fins surrounding the tubing.

Further, it is known to use pressurized air to at least partially clean smooth-sided boiler tubes. These devices are commonly known as soot blowers and generally have hand-held hoses that users direct to banks of tubes as they walk across and up and down scaffolding. The scaffolding is erected and disassembled specifically for cleaning the tubes. This process is not efficient because of the significant down time required for erecting the scaffolding, cleaning the tubes, and the disassembly of the scaffolding.

Thus there is a need for an efficient cleaning system and method that improves on the previously known systems and methods.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
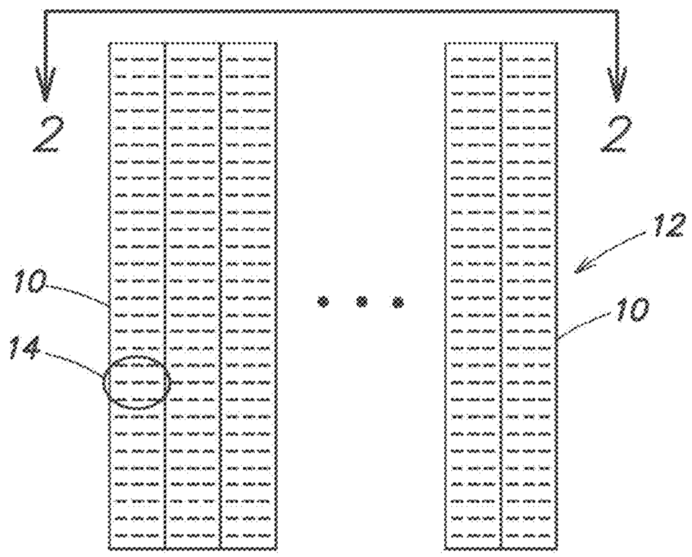
FIG. 1 (Prior Art)
FIG. 1 is a prior art elevation of a bank of HRSG finned-tubing.
Figure 2:
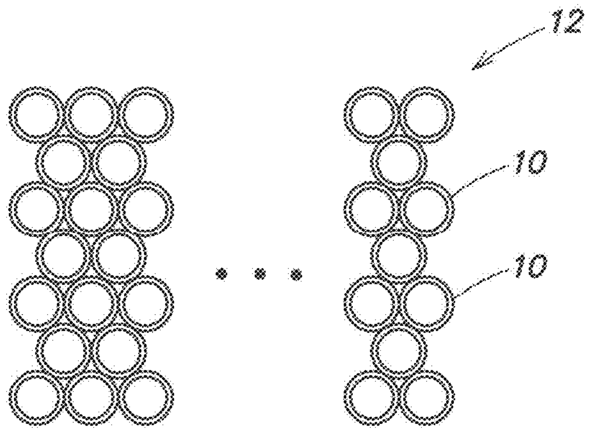
FIG. 2 (Prior Art)
FIG. 2 is a top view of FIG. 1 taken along line 2-2.
Figure 3:
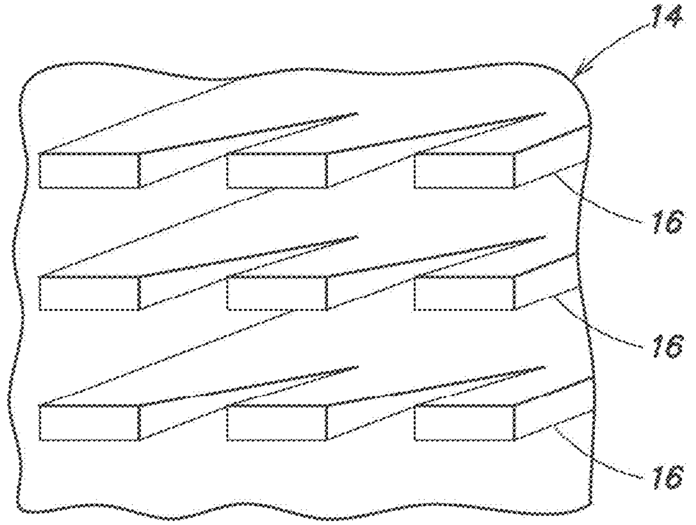
FIG. 3 (Prior Art)
FIG. 3 is a detail of a portion of FIG. 1.

The applicants have unexpectedly discovered that the combined use of explosive detcord and pressurized air provides an efficient cleaning system and method for HRSG finned-tubing that allows for cleaning larger areas, quicker, more efficiently, and more thoroughly compared to prior art systems and methods. Typically, HRSG finned tubes 10 are constructed in a bank 12, as shown in FIG. 1, with multiple banks 12 placed in an HRSG (see FIG. 4). A single tube bank 12 may consist of multiple tubes 10 and be 24 feet wide by 60 feet tall by 7 rows of tubes 10, as shown in FIG. 2. The rows of tubes 10 are typically tightly arranged such that each tube 10 generally contacts each adjacent tube 10, as shown. FIG. 3 is a partial detail 14 of FIG. 1, showing the general arrangement of fins 16.

Prior to the present disclosure it was believed and feared that using explosives, including detcord, would damage the HRSG tubes because the fins 16 would be bent, damaged, and the efficiency of the heat transfer negatively impacted. The present disclosure unexpectedly shows that properly arranged and exploded explosive subassembly 20 in combination with a pressurized air subassembly 22 will clean HRSG finned-tubing more efficiently and more thoroughly than prior art systems.

Figure 4:
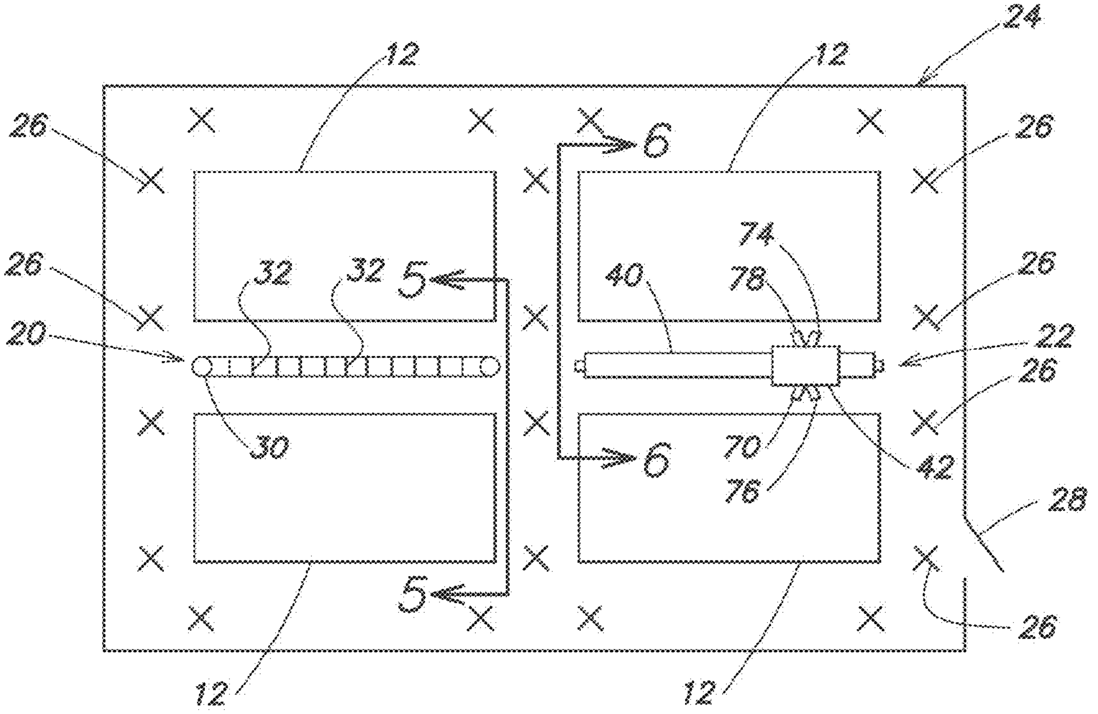
FIG. 4 is a top view of an HRSG facility, including an example cleaning system.

FIG. 4 shows a top view inside an HRSG facility 24 that contains a plurality of tube banks 12 with an example explosive subassembly 20 and an example pressurized air subassembly 24 positioned between and adjacent banks 12 of HRSG finned-tubing. Each 'x' 26 denotes a possible position for suspending the subassemblies 20, 22 to clean the banks 12. The subassemblies may be partially assembled outside the facility 24, where there is more room and assembly is more convenient. The assembled or partially assembled subassemblies may then be moved inside facility 24 through any available door 28.

Figure 5:
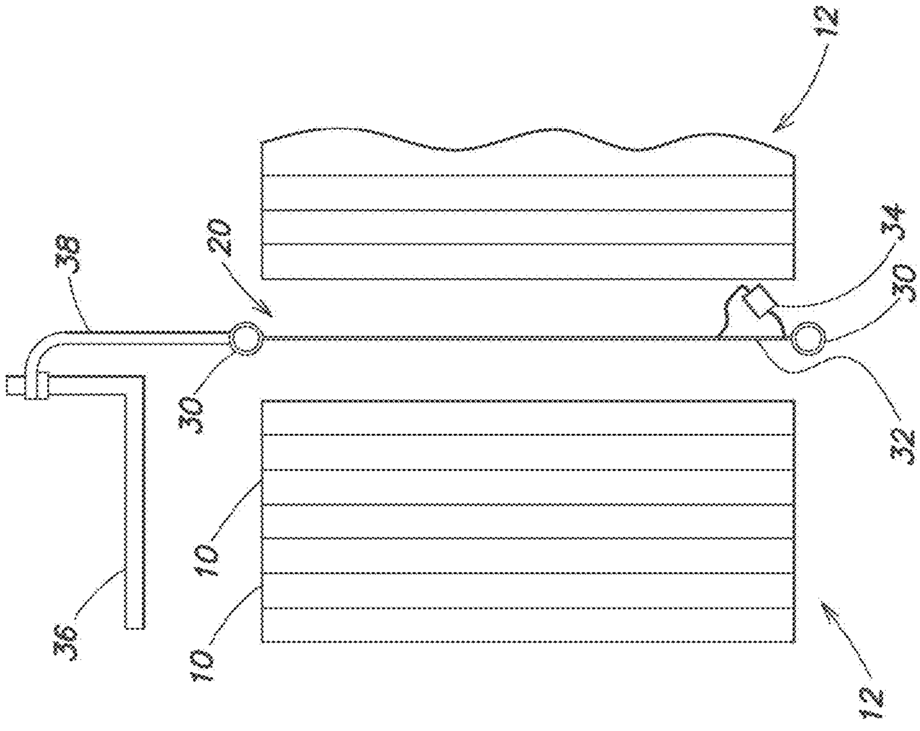
FIG. 5 is an elevation of a portion of FIG. 4 along line 5-5.

FIG. 5 is a partial elevation taken along line 5-5 of FIG. 4, showing an end view of the example explosive subsystem 20. Referring to FIGS. 4 and 5, the explosive subsystem 20 may include a pair of elongated rods 30, a plurality of detcords 32, of essentially equal length and with an explosive grain loading of 18-50 grains per foot, and a detonation delay assembly 34. Opposite ends of each detcord 32 are attached to each of the elongated rods 30, in a generally uniformly spaced manner, forming a plurality of essentially parallel straight lengths of detcord 12 (best shown in FIG. 7) when at least one of the rods 30 is suspended adjacent a bank 12 of HRSG finned-tubing, as shown. The detcords 32 may be attached to rods 30 by any acceptable manner, such as tape, fasteners, ties, etc. The detonation delay assembly 34 is connected to each length of detcord 32 such that each detcord 32 explodes in sequence with a predetermined delay between each explosion.

Blast waves from the detcords 32 cause dislodgement of rust scale and other fouling on the fins 16. The fins 16 are durable, but also delicate at the same time. Replacing damaged tubes 10 is expensive and results in costly down time for the HRSG facility. A delay between each detcord explosion allows the pressure wave of each explosion to dissipate adequately before the next explosion, thus aiding in preventing damage to the fins by excessive blast wave pressure. The delay between explosions depends on the grain load of each detcord 32, the spacing between detcords 32 (typically 12 inches), and the spacing between the detcord 32 and the banks 12 (typically 12 inches). The detonation delays are typically 5-25 milliseconds.

Figure 7:
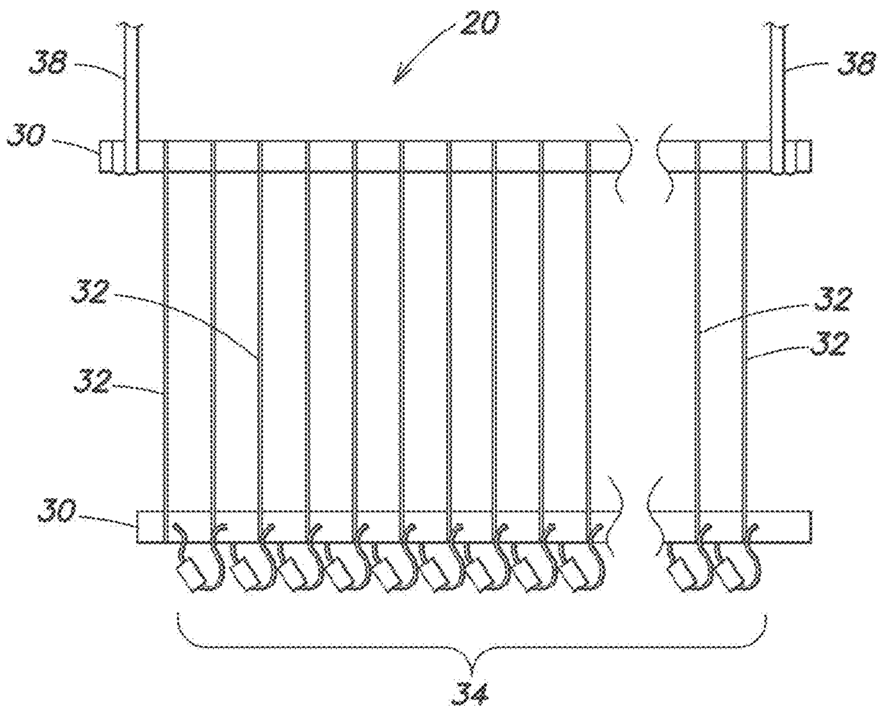
FIG. 7 is an elevation of an example explosive subsystem.

FIG. 5 also shows a balcony or scaffold 36 (not shown in FIG. 4 for clarity), that is typically a part of facility 24, and from which a pair of ropes 38 are suspended. Ropes 38 may be attached to one of the rods 30 to suspend and straighten each detcord 32. FIG. 7 shows a partial elevation of explosive subsystem 20 suspended by a rod 30. Bank 12 is not shown in FIG. 7 for clarity of showing the details of explosive subsystem 20. It has been found that placing detcords 32 approximately 12 inches from a bank 12 provides safe and effective dislodgement of fouling from fins 16 without damaging fins 16.

Figure 6:
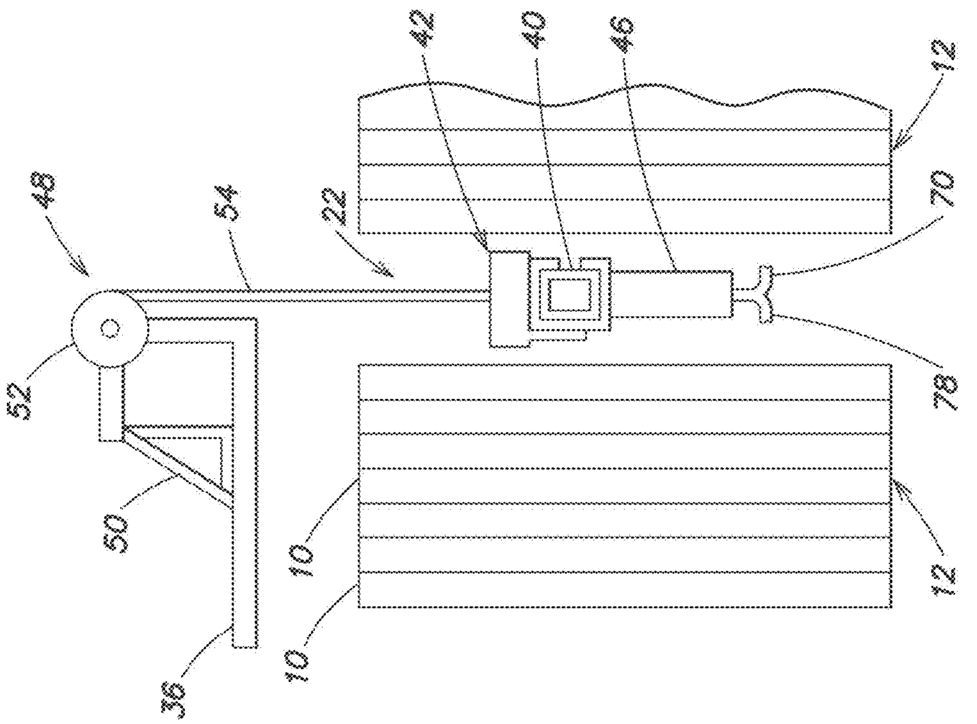
FIG. 6 is an elevation of a portion of FIG. 4 along line 6-6.
Figure 8:
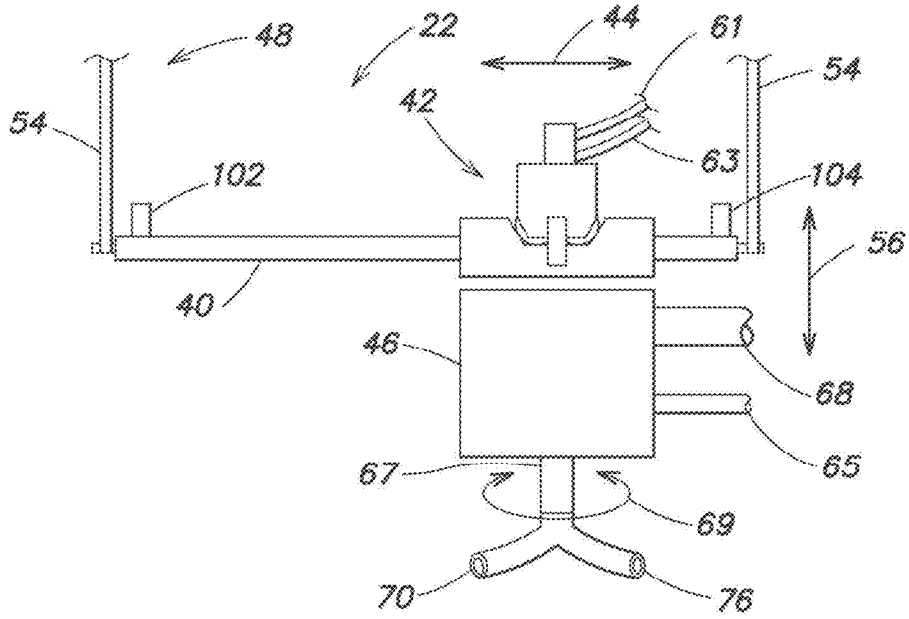
FIG. 8 is an elevation of an example pressurized air subsystem.

FIG. 6 is a partial elevation taken along line 6-6 of FIG. 4, showing an end view of pressurized air subsystem 22. Referring to FIGS. 4, 6, and 8, the pressurized air subsystem 22 may include an elongated beam 40, a transport assembly 42 operably coupled to the elongated beam 40 for reciprocal movement (as shown by arrow 44 in FIG. 8) along a portion of a length of the beam 40, a pressurized air blower assembly 46 operably coupled to the transport assembly 42, and a suspension assembly 48 suspends the elongated beam 40, the transport assembly 42, and the pressurized air blower assembly 46 adjacent the bank 12 of HRSG finned-tubing after the detcords 32 have been exploded. FIG. 6 also shows the balcony or scaffold 36 that is typically a part of facility 24, upon which suspension assembly 48 is mounted. Suspension assembly 48 may further include a pair of tripods 50 (only one tripod shown) supporting winches 52 having cables 54 from which suspension assembly 22 is suspended. The pair a winches 52 (only one shown) may be mounted above the bank 12 of HRSG finned-tubing and each winch 52 is connected to opposing ends of the elongated beam 40. The transport assembly 42 moves the pressurized air blower assembly 46 along a portion of the beam at least once as the pressurized air blower assembly 46 directs pressurized air towards the bank 12 of HRSG finned-tubing. The suspension assembly 48 moves the suspended elongated beam 40, the transport assembly 42, and the pressurized air blower assembly 46 up or down (as indicated by arrow 56 of FIG. 8) after the transport assembly 42 and pressurized air blower assembly 46 have moved along the portion of the beam length at least once, so that a next portion of the bank 12 of HRSG finned-tubing may be cleaned by pressurized air.

For a typical HRSG facility the rods 30 are at least 24 feet long, each of the detcords 32 are more than 60 feet long, the spacing between each detcord 32 is approximately 12 inches, the spacing between the detcords 32 and the bank 12 of HRSG finned-tubing is approximately 12 inches, the predetermined delay between each explosion is between 5-25 milliseconds, and the elongated beam 40 is at least 24 feet long. The beam 40 may be an aluminum four inch box beam or other beam of similar size and strength to support the transport assembly 42 and the pressurized air blower assembly 46.

Figure 9:
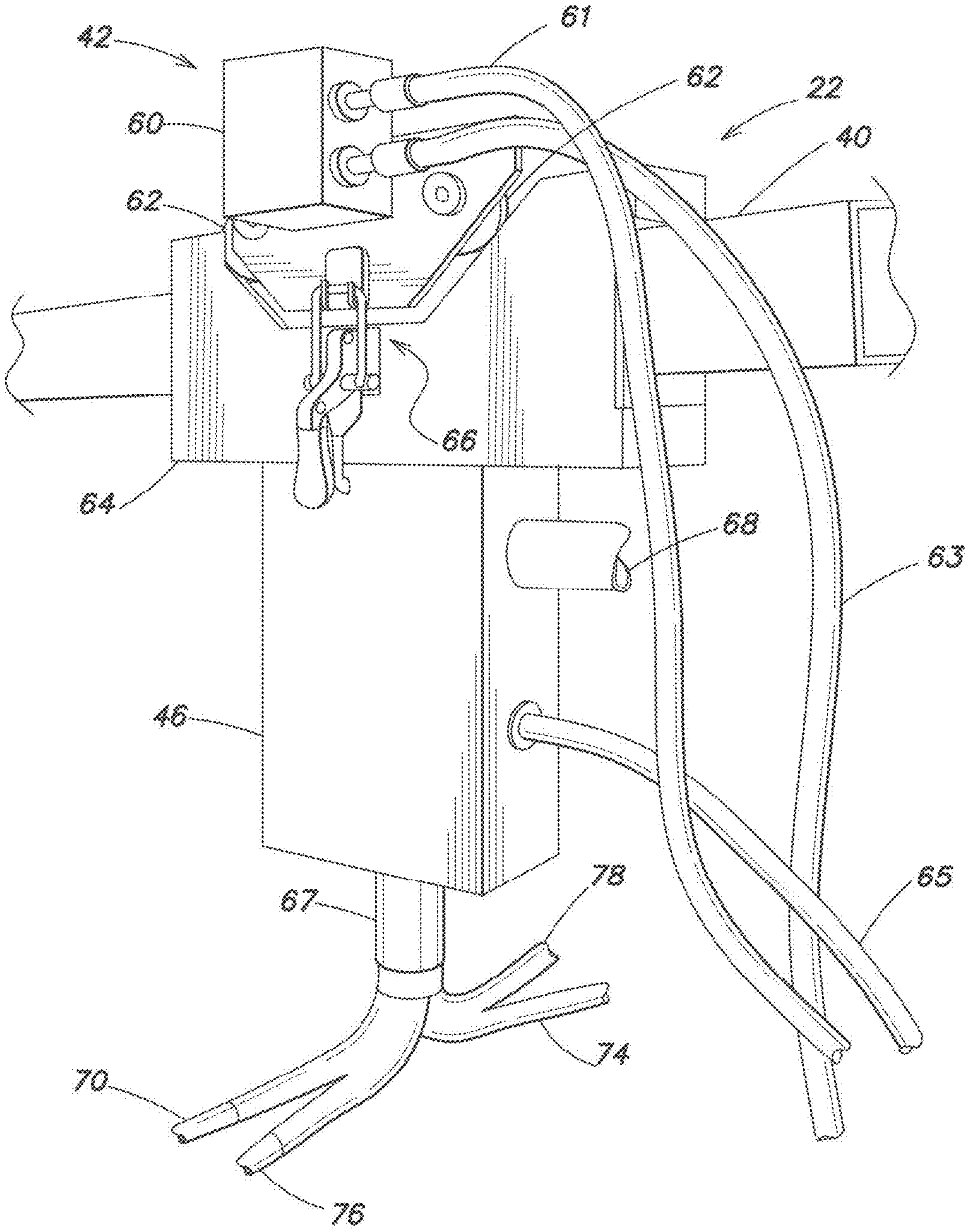
FIG. 9 is a partial perspective of FIG. 8.
Figure 11:
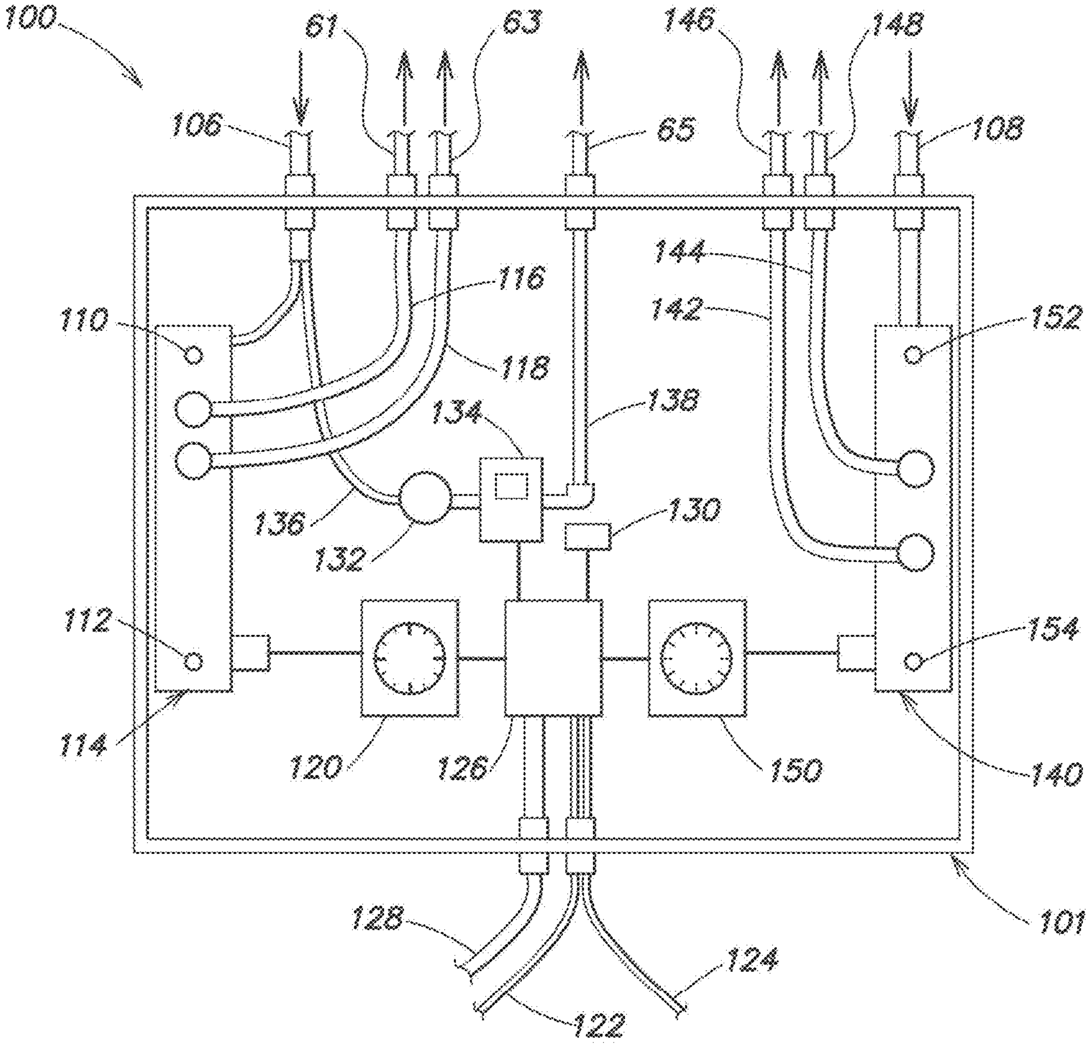
FIG. 11 is a detail of a portion of an example automatic control.

The transport assembly 42, best seen in FIG. 9, may include a drive motor 60 connected to a set of drive wheels 62 for moving the transport assembly 42 back and forth along the elongated beam 40. The transport assembly 42 may move along the elongated beam 40 at a rate of 1-12 inches per minute. The transport assembly 42 may further include a bracket 64 that may be conveniently attached to motor 60 with a pair of fast clamps 66 (only one clamp shown). Bracket 64 acts as a guide for wheels 62 and provides structure for operably coupling to the pressurized air blower assembly 46. In the example shown motor 60 is a pneumatic motor powered by compressed air (source not shown) delivered via drive hoses 61, 63 connected to controller 100 (described in detail below). During operation, compressed air from drive hose 61 causes the motor 60 to rotate is a first direction to drive wheels 62 in a first direction across beam 40. When transport assembly contacts a limit switch 102 or 104, controller 100 (discussed below with respect to FIG. 11) closes off the compressed air to drive hose 61 and supplies compressed air to drive hose 63 to cause a reversal of motor 60 and drive wheels 62 across beam 40 in an opposite direction. It is noted that motor 60 and the associated controls may be any type of suitable motor and controls, such as electrical, hydraulic, etc.

Figure 10:
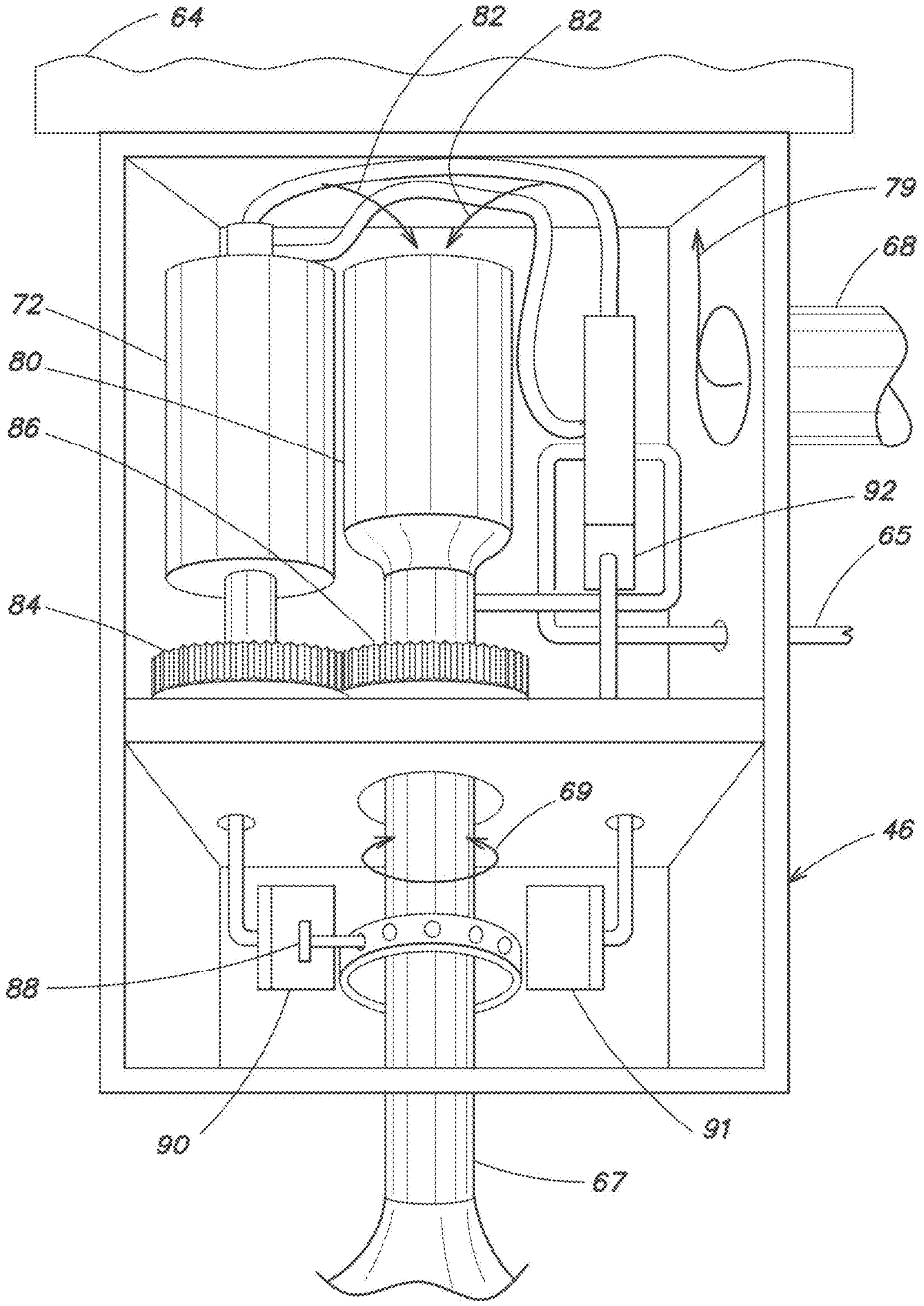
FIG. 10 is a detail of an example pressurized air blower assembly.

Referring to FIGS. 8-10, the pressurized air blower assembly 46 may include an inlet 68 for receiving pressurized air, and at least one outlet nozzle 70 for directing the pressurized air towards the bank 12 of HRSG finned-tubing. The pressurized air blower assembly 46 may deliver a volume of air between 250-1600 cubic-feet per minute. A pressure produced at the at least one outlet nozzle 70 may be 100-600 pounds per square-inch. The pressurized air blower assembly 46 may further include a motor 72 for oscillating the at least one outlet nozzle 70 during use. The at least one outlet nozzle 70 may be positioned approximately 4 inches from the bank 12 of HRSG finned-tubing. The motor 72 of the present example may be pneumatic and may be powered by pressurized air via hose 65. Of course, motor 72 may be any type of suitable motor, such as electric, hydraulic, etc. The motor 72 causes the pipe 67 to rotate back and forth, as indicated by arrow 69.

The pressurized air blower assembly 46 may further include at least a second outlet nozzle 74 for directing the pressurized air in an opposite direction from the at least one nozzle 70 and towards another bank 12 of HRSG finned-tubing. Still further, the pressurized air blower assembly 46 may include a third outlet nozzle 76 adjacent the at least one outlet nozzle 70 and a fourth outlet nozzle 78 adjacent the second outlet nozzle 74.

Pressurized air flows into assembly 46, as indicated by arrow 78. Assembly 46 in operation is fully enclosed and relatively airtight such that the pressurized air from inlet 68 is forced into intake 80, as indicated by arrows 82, and through pipe 67 and nozzles 70, 74, 76, 78. As assembly 46 moves, motor 72 causes pipe 67 to rotate in a first direction via cooperation between gear plates 84, 86. Stop post 88, attached to pipe 67, contacting a poppet valve 90, 91 (e.g. available from Parker Hannifin Corporation) causes 3-way, 2-position valve 92 to switch the supply of compressed air to motor 72 causing the rotation of the motor 72 and pipe 67 to reverse. The pressurized air blower assembly 46 operates by receiving pressurized air through inlet 68 that is connected to an air compressor (not shown for convenience), such as a 1300H Sullair® air compressor.

Preferably, the transport assembly 42 moves the pressurized air blower assembly 46 along the portion of the beam 40 length twice before the suspension assembly 48 moves the suspended elongated beam 40, the transport assembly 42, and the pressurized air blower assembly 46 up or down. The suspension assembly 48 may move the suspended elongated beam 40, the transport assembly 42, and the pressurized air blower assembly 46 up or down 1-3 inches.

Referring to FIG. 10 the pressurized air blower assembly 46 operates by receiving pressurized air through inlet 68 that is connected to an air compressor (not shown for convenience), such as a 1300H Sullair® air compressor.

An example cleaning system may further include an automatic control 100 (see FIG. 11) having a first limit switch 102 (shown in FIG. 8) connected to the elongated beam 40 for causing the transport assembly 42 to reverse direction once the transport assembly 42 contacts the first limit switch 102 and a second limit switch 104 connected to the elongated beam 40 for causing the suspension assembly 48 to move the suspended elongated beam 40, the transport assembly 42, and the pressurized air blower assembly 46 and causing the transport assembly 42 to again reverse direction once the transport assembly 42 contacts the second limit switch 104. The automatic control 100 may further include a manual control for over-riding the automatic control 100.

The example cleaning system described above may be used in a method of cleaning HRSGs. The method may include suspending at least one elongated rod 30 adjacent a bank 12 of HRSG finned-tubing such that a plurality of generally uniformly spaced detcords 32, attached to the rod 30, form essentially parallel straight lengths of detcords 32, each detcord 32 having an explosive grain loading of 18-50 grains per foot.

Next, exploding each detcord 32 in a sequence where a detonation delay assembly 34 attached to each of the plurality of detcords 32 creates a predetermined delay between each detcord explosion. Then, after the detcords 32 are exploded, suspending an elongated beam 40, having a transport assembly 42 and a pressurized air blower assembly 46 operably coupled to the elongated beam 40, adjacent the bank 12 of HRSG finned-tubing. Next, moving the pressurized air blower assembly 46, with the transport assembly 42, along a portion of the beam 40 as the pressurized air blower assembly 46 directs pressurized air towards the bank 12 of HRSG finned-tubing.

Next, moving the beam 40, the transport assembly 42, and the pressurized air blower assembly 46 up or down, after the pressurized air assembly 46 has moved along the portion of the beam 40, so that a next portion of the bank 12 of HRSG finned-tubing may be cleaned by pressurized air.

The winches 52 may each be 1000 pound pneumatic winches (with a line speed of 43 feet per minute at 90 pounds per square inch of air pressure) and the winch cables 54 may be attached to the beam 40 via any acceptable fasteners, such as eye-bolts attached to each end of the beam 40. The distance the suspension assembly 48 moves the beam 40 may depend on the amount of fouling to be dislodged from the fins 16, the air pressure generated, and the dispersion pattern created by outlet nozzles 70, 74-78. Likewise, the rate at which the transport assembly 42 moves along beam 40 may depend on the condition of fins 16, the air pressure generated, and the dispersion pattern of the outlet nozzles.

The pressurized air blower assembly 46 may include a motor 72 oscillating the outlet nozzles. The motor 72 may create about 55 foot-pounds of torque.

The pressurized air subsystem 22 may be run automatically as described above or manually. The automatic control 100, shown in FIG. 11, may be connected to the pressurized air subsystem 22. The control 100 may be connected to a source of pressurized air, (not shown for convenience) via hoses 106, 108 to a housing 101. Manual control of the direction of travel for the transport assembly 42, allows a user to override the automatic control via buttons 110, 112 on solenoid valve 114 (e.g. a 5-port, 4-way, 3-position double solenoid available from NITRA®).

Solenoid valve 114 controls the direction of travel of transport assembly 42 by switching the compressed air supply between lines 116, 118 that are connected to hoses 61 and 63, as shown. Solenoid 114 is controlled by the timer 120 and inputs from limit switches 102, 104 that are received via cables 122, 124. The inputs from limit switches cause the latching relay 126 to send signals causing solenoid 114 to switch the air supply from one of lines 116, 118 to the other line, thus reversing the travel direction. Control 100 receives electrical power via power cable 128 and a 12-volt power inverter 130. The timer 120 may control the time of travel for travel assembly 42 and/or a duration that the travel assembly pauses before moving again after beam 40 is raised/lowered.

The motor 72 rotation direction and speed of oscillation is controlled by the combination of regulator 132 and the on/off switch valve 134. Pressurized air is received through line 136 and delivered to hose 65 via line 138.

The winches 52 (shown in FIG. 6) are controlled by solenoid valve 140, which may be the same type valve as solenoid 114. Compressed air is received by solenoid 140 from hose 108 and switches the compressed air between lines 142, 144, causing the winches to rotate in a desired direction to raise or lower pressurized air subassembly 22. Hoses 146, 148 (not shown in other figures) are connected to winches 52. Timer 150 may control the time between when the winches 52 are activated to raise/lower the subassembly 22 and an amount of time the winches are activated. A manual override of the winch movement may be achieved via buttons 152, 154.

Figure 12:
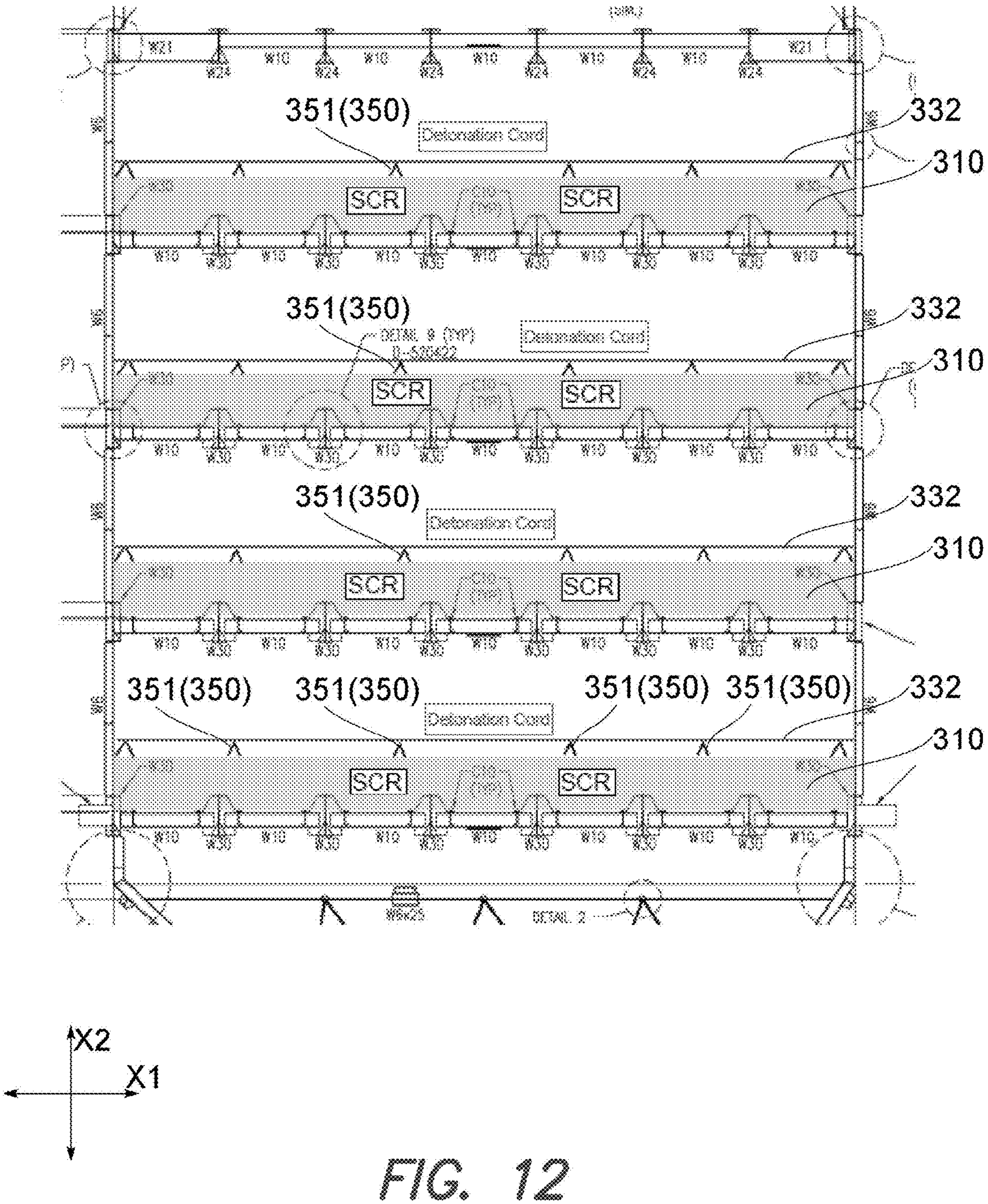
FIG. 12 is a partial side view of an example of a cleaning system with an SCR system.

FIG. 12 is a partial side view of an example of a cleaning system with a selective catalytic reduction (SCR) system. The cleaning system may be used to clean the SCR system. The SCR system may include a plurality of components, such as an SCR catalyst. The SCR system has a decreased NOx potential efficiency as a result of particulate pluggage in the system or in one or more channels in the SCR catalyst which renders at least a portion of the catalytic active areas inaccessible for the flue gas. The method discussed with reference to FIGS. 3-11 may be used for cleaning such an SCR system. Some embodiments of the present disclosure may include: removal of the particulates and plug(s) using a cleaning system. Some embodiments may include suspending and exploding, adjacent to an SCR catalyst, a plurality of generally uniformly spaced detonation cords. Each detonation cord may have an explosive grain loading of 18-50 grains per foot. A detonation delay assembly attached to each of the plurality of detonation cords may create a predetermined delay between each detonation cord explosion. After the detonation cords are exploded, a pressurized air blower assembly directs pressurized air towards an adjacent SCR catalyst bed.

In the embodiments shown in FIG. 12, the SCR system may include a plurality of components 310 that extend in a horizontal direction X1. The plurality of components 310 are spaced apart from each other in a vertical direction X2. As shown in FIG. 12, the cleaning system may include a plurality of detonation cords 332 that extend along a direction different from the vertical direction X2. In the illustrated example, each of the plurality of detonation cords 332 extends along the horizontal direction X1. In some embodiments, each of the plurality of detonation cords 322 may have an explosive grain loading of 18-50 grains per foot. The plurality of detonation cords 332 may extend in parallel to each other. The plurality of detonation cords 332 and the plurality of components 310 may be alternately arranged in the vertical direction X2.

In some embodiments, the system may include a locating assembly 350. The locating assembly 350 may space each of the detonation cords 332 apart from a system (e.g., the SCR system in the illustrated embodiment) to be cleaned. The locating assembly 350 may include a plurality of cord supports 351, provided in order to prevent the detonation cords 332 from coming in contact with the catalyst or other component 310 to be cleaned. The cord supports 351 may be arranged on one of the components 310. In the illustrated example, the plurality of cord supports 351 may support one of the plurality of detonation cords 332 to be spaced apart from the one of the components 310 such as an SCR catalyst. In some embodiments, the cord supports 351 may be configured to horizontally hold the detonation cord 332 to be spaced apart from the corresponding component 310 extending along the horizontal direction X1. The cord supports 351 may be made of various materials, including metal (e.g., heavy steel), and may be removably fixed to the corresponding one of the components 310. Accordingly, the cord supports 351 may be provided only for cleaning the system. As such, the cord supports 351 may be configured to be removed from the components 310 after cleaning of the system is completed.

According to the present embodiment shown in FIG. 12, the components 310 may be cleaned by exploding the plurality of the plurality of detonation cords 332. Above-noted configurations, which may be used for cleaning an HRSG and are discussed with reference to FIGS. 3-11, may be incorporated in the system for cleaning the SCR system in FIG. 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A cleaning system comprising:
an explosive subsystem including:
a plurality of detonation cords; and
a locating assembly locating the plurality of detonation cords relative to each other and relative to a system to be cleaned; and
a secondary cleaning assembly different from the explosive subsystem, the secondary cleaning assembly being adjacent a portion of the system to be cleaned, the secondary cleaning assembly being configured to remove dislodged fouling from the system to be cleaned after detonation of the detonation cords.

2. The cleaning system of claim 1, further comprising a detonation delay assembly, and wherein the detonation delay assembly is connected to each detonation cord such that each detonation cord explodes in sequence with a predetermined delay between each detonation.

3. The cleaning system of claim 1, wherein the plurality of detonation cords extend substantially in parallel with each other.

4. The cleaning system of claim 1, wherein the locating assembly includes a plurality of cord supports arranged on at least one component of the system to be cleaned, and wherein the plurality of cord supports support at least one of the plurality of detonation cords and locates the corresponding at least one of the plurality of detonation cords relative to the system to be cleaned.

5. The cleaning system of claim 4, wherein each of the plurality of cord supports is removably fixed to the corresponding at least one component such that the cord supports are provided only for cleaning of the system.

6. The cleaning system of claim 1, wherein each of the plurality of detonation cords has an explosive grain loading of 18-50 grains per foot.

7. The cleaning system of claim 1, further comprising an elongated beam, wherein the elongated beam is a box beam.

8. The cleaning system of claim 1, further comprising:
an elongated beam; and
a transport assembly operably coupled to the elongated beam for reciprocal movement along a portion of a length of the elongated beam;
wherein the transport assembly includes a drive motor connected to a set of drive wheels for moving the transport assembly back and forth along the elongated beam.

9. The cleaning system of claim 1, wherein the secondary cleaning assembly is a pressurized air blower assembly, and wherein the secondary cleaning assembly includes an inlet for receiving pressurized air and at least one outlet nozzle for directing the pressurized air towards the system to be cleaned,
wherein the cleaning system further includes:
at least a second outlet nozzle for directing the pressurized air in a direction different from the at least one outlet nozzle and towards a second system to be cleaned,
a third outlet nozzle adjacent the at least one outlet nozzle; and
a fourth outlet nozzle adjacent the at least a second outlet nozzle.

10. The cleaning system of claim 1, further comprising:
an elongated beam;
a transport assembly for moving the secondary cleaning assembly along the elongated beam; and
a suspension assembly suspending the elongated beam;
wherein the suspension assembly comprises a plurality of winches mounted above the portion of the system to be cleaned.

11. The cleaning system of claim 10, wherein the transport assembly moves the secondary cleaning assembly along a length of the elongated beam before the suspension assembly moves the suspended elongated beam, the transport assembly, and the secondary cleaning assembly up or down.

12. The cleaning system of claim 11, wherein the suspension assembly moves the suspended elongated beam, the transport assembly, and the pressurized air blower assembly up or down 1-3 inches.

13. The cleaning system of claim 1, wherein each of the plurality of detonation cords has an explosive grain loading along a length of the respective detonation cords.

14. The cleaning system of claim 1, further comprising:
an assembly configured to move, relative to the portion of the system to be cleaned, the secondary cleaning assembly along the portion of the system to be cleaned.

15. A cleaning system comprising:
an explosive subsystem including:
a plurality of detonation cords; and
a locating assembly locating the plurality of detonation cords relative to each other and relative to a system to be cleaned; and
a secondary cleaning assembly adjacent a portion of the system to be cleaned, the secondary cleaning assembly being configured to remove dislodged fouling from the system to be cleaned after detonation of the detonation cords,
wherein the secondary cleaning assembly is a pressurized air blower assembly, and wherein the secondary cleaning assembly includes an inlet for receiving pressurized air and at least one outlet nozzle for directing the pressurized air towards the system to be cleaned,
wherein the cleaning system comprises at least of one of following:
wherein the pressurized air blower assembly delivers a volume of air of 250-1600 cubic feet per minute;
wherein the cleaning system further includes a motor for oscillating the at least one outlet nozzle during use,
wherein the at least one outlet nozzle is positioned approximately 4 inches from the system to be cleaned; and
wherein the cleaning system further includes at least a second outlet nozzle for directing the pressurized air in a direction different from the at least one outlet nozzle and towards a second system to be cleaned.

16. The cleaning system of claim 15, wherein a pressure produced at the at least one outlet nozzle is 100-600 pounds per square-inch.

17. A cleaning system comprising:
an explosive subsystem including:
a plurality of detonation cords; and
a locating assembly locating the plurality of detonation cords relative to each other and relative to a system to be cleaned; and
a secondary cleaning assembly adjacent a portion of the system to be cleaned, the secondary cleaning assembly being configured to remove dislodged fouling from the system to be cleaned after detonation of the detonation cords,
wherein the explosive subsystem includes a pair of elongated rods, wherein opposite ends of each of the detonation cords are each attached to each of the elongated rods in a generally uniformly spaced manner forming a plurality of substantially parallel lengths of the detonation cords when at least one of the elongated rods is suspended adjacent the portion of the system to be cleaned.

* * * * *